(12) United States Patent
Hansen et al.

(10) Patent No.: US 9,104,569 B2
(45) Date of Patent: Aug. 11, 2015

(54) METHOD AND APPARATUS FOR SIGNAL DETECTION AND DECODING

(71) Applicant: Broadcom Corporation, Irvine, CA (US)

(72) Inventors: Morten Hansen, Vanlose (DK); Lars Christensen, Charlottenlund (DK)

(73) Assignee: BROADCOM CORPORATION, Irvine, CA (US)

(*) Notice: Subject to any disclaimer, the term of this patent is extended or adjusted under 35 U.S.C. 154(b) by 16 days.

(21) Appl. No.: 14/045,994

(22) Filed: Oct. 4, 2013

(65) Prior Publication Data

US 2014/0101522 A1    Apr. 10, 2014

(30) Foreign Application Priority Data

Oct. 5, 2012 (GB) .................................. 1217885.1

(51) Int. Cl.
*H04L 1/00* (2006.01)
*H04L 1/20* (2006.01)
*G06F 11/07* (2006.01)

(52) U.S. Cl.
CPC .......... *G06F 11/0751* (2013.01); *H04L 1/0025* (2013.01); *H04L 1/0045* (2013.01); *H04L 1/0072* (2013.01); *H04L 1/20* (2013.01)

(58) Field of Classification Search
CPC .......... G11B 20/1833; G11B 20/1866; G11B 2020/1823; H03M 13/1102; H03M 13/15; H03M 13/09; H03M 13/1108; H03M 13/17; H04L 1/0025; H04L 1/0045; H04L 1/0072; H04L 1/20

USPC .................................................. 714/755, 762
See application file for complete search history.

(56) References Cited

U.S. PATENT DOCUMENTS

| | | | | |
|---|---|---|---|---|
| 5,684,810 A * | 11/1997 | Nakamura et al. | ............ | 714/755 |
| 5,696,774 A * | 12/1997 | Inoue et al. | ............ | 714/755 |
| 5,708,665 A * | 1/1998 | Luthi et al. | ............ | 714/704 |
| 5,835,509 A * | 11/1998 | Sako et al. | ............ | 714/755 |
| 5,942,003 A * | 8/1999 | Ivry | ............ | 714/762 |
| 7,370,262 B2 * | 5/2008 | Hwang et al. | ............ | 714/775 |
| 7,861,141 B2 * | 12/2010 | Chen et al. | ............ | 714/769 |
| 8,176,399 B2 * | 5/2012 | Tan et al. | ............ | 714/788 |
| 8,739,002 B2 * | 5/2014 | Nakamura et al. | ............ | 714/779 |

\* cited by examiner

*Primary Examiner* — James C Kerveros
(74) *Attorney, Agent, or Firm* — Oblon, McClelland, Maier & Neustadt, L.L.P.

(57) ABSTRACT

A method, apparatus and computer program product are provided herein for enabling the joint detection and decoding of uplink state flag symbols. In this regard, a method is provided that determining one or more residual error terms by jointly detecting and decoding in one or more bursts of a radio block. In some example embodiments, the one or more residual error terms are determined over a plurality of uplink state flag symbols in the one or more bursts that correspond to a plurality of available uplink state flag sequences. The method of this embodiment may also include determining a weighted error measure for each of the plurality of available uplink state flag sequences based on the one or more residual error terms. The method of this embodiment may also include determining an uplink state flag value based on the plurality of weighted error measures.

20 Claims, 4 Drawing Sheets

METHOD AND APPARATUS FOR SIGNAL DETECTION AND DECODING

CROSS-REFERENCE TO RELATED APPLICATIONS

This application claims priority to UK Application No. 1217885.1, filed Oct. 5, 2012, which is hereby incorporated herein in its entirety by reference.

TECHNICAL FIELD

Embodiments of the present invention relate generally to communications technology and, more particularly, to example signal detection and decoding.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing functionality that only a few years ago required processing power provided only by the most advanced desktop computers. Consequently, mobile computing devices having a small form factor have become ubiquitous and are used by consumers of all socioeconomic backgrounds.

As a result of the expansion in computing power and reduction in size of mobile computing devices, mobile computing devices are being marketed with an ever increasing array of features. For example, communication systems, such as the Global System for Mobile Communications (GSM®), are continuously evolving to include additional features and increased data rates. One such example of the ability to provide increased data rates in GSM is the Enhanced General Packet Radio Service (EGPRS) and related extension EGPRS2. In some examples, EGPRS and EGPRS2 are configured to employ Uplink State Flag (USF) symbols to specify an instance in which a communication device is permitted to transmit data. For example, at a given time, an uplink resource may be allocated to the communication device in the GSM system as signaled via the USF value.

In some examples, the communication device is configured to decode the USF symbols received in a radio block from a base station. In an instance in which the decoded USF value matches the allocated USF, the communication device is then, for example, permitted to cause the transmission of data.

In order to prevent the communication device from transmitting data in an incorrect uplink resource or at a time when the uplink resources has not been allocated, the USF value is configured to be detected reliably in instance in which it is transmitted by the base station. In some cases, the 3rd Generation Partnership Project (3GPP) has established a minimum USF detection performance. The performance requirements are at least partially defined in 3GPP TS 45.003, which is incorporated by reference in its entirety herein.

SUMMARY

In some example embodiments, a method is provided that comprises determining one or more residual error terms by jointly detecting and decoding in one or more bursts of a radio block. In some example embodiments, the one or more residual error terms are determined over a plurality of uplink state flag symbols in the one or more bursts that correspond to a plurality of available uplink state flag sequences. The method of this embodiment also includes determining a weighted error measure for each of the plurality of available uplink state flag sequences based on the one or more residual error terms. The method of this embodiment also includes determining an uplink state flag value based on the plurality of weighted error measures.

In further example embodiments, an apparatus is provided that includes a processing system, which may be embodied by at least one processor and at least one memory including computer program code. The processing system is arranged to cause the apparatus to at least determine one or more residual error terms by jointly detecting and decoding in one or more bursts of a radio block. In some example embodiments, the one or more residual error terms are determined over a plurality of uplink state flag symbols in the one or more bursts that correspond to a plurality of available uplink state flag sequences. The processing system is also arranged to cause the apparatus to determine a weighted error measure for each of the plurality of available uplink state flag sequences based on the one or more residual error terms. The processing system is also arranged to cause the apparatus to determine an uplink state flag value based on the plurality of weighted error measures.

In yet further example embodiments, a computer program product may be provided that includes at least one non-transitory computer-readable storage medium having computer-readable program instructions stored therein with the computer-readable program instructions including program instructions, which, when executed by an apparatus, causes the apparatus to perform the steps of: determining one or more residual error terms by jointly detecting and decoding in one or more bursts of a radio block; determining a weighted error measure for each of the plurality of available uplink state flag sequences based on the one or more residual error terms; and determining an uplink state flag value based on the plurality of weighted error measures. In some example embodiments, the one or more residual error terms are determined over a plurality of uplink state flag symbols in the one or more bursts that correspond to a plurality of available uplink state flag sequences.

In yet further example embodiments, an apparatus is provided that includes means for determining one or more residual error terms by jointly detecting and decoding in one or more bursts of a radio block. In some example embodiments, the one or more residual error terms are determined over a plurality of uplink state flag symbols in the one or more bursts that correspond to a plurality of available uplink state flag sequences. The apparatus of this embodiment also includes means for determining a weighted error measure for each of the plurality of available uplink state flag sequences based on the one or more residual error terms. The apparatus of this embodiment also includes means for determining an uplink state flag value based on the plurality of weighted error measures.

BRIEF DESCRIPTION OF THE DRAWINGS

Figure 1:
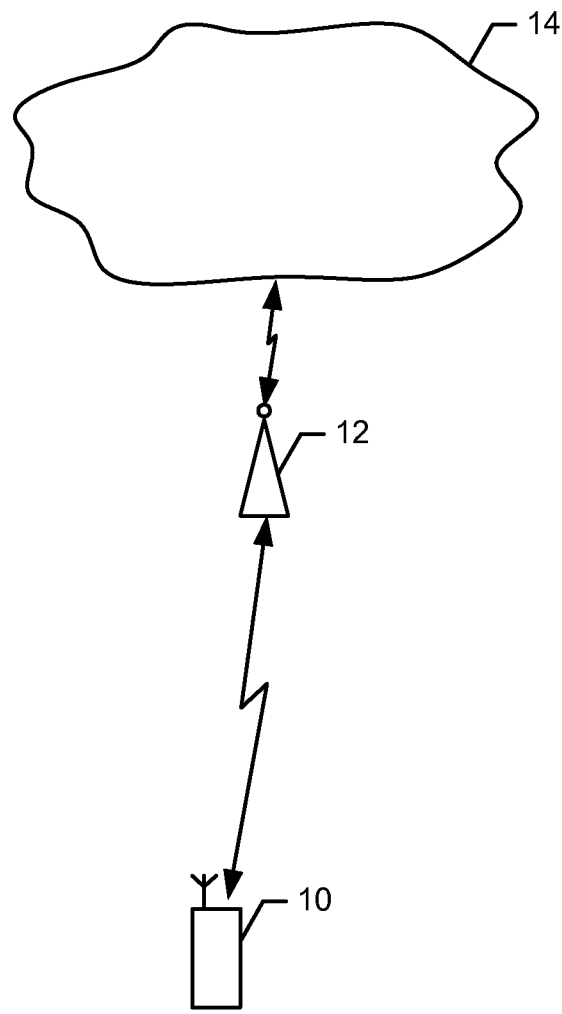
Figure 2:
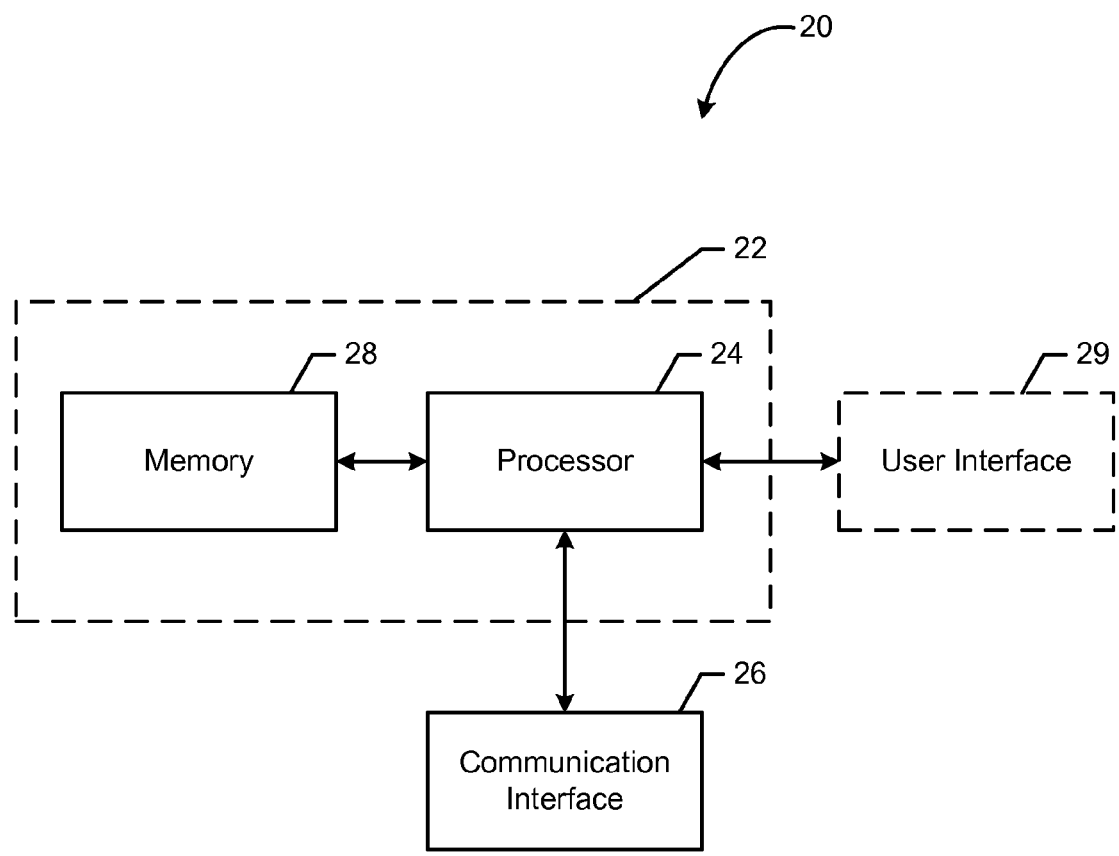
Figure 3A:
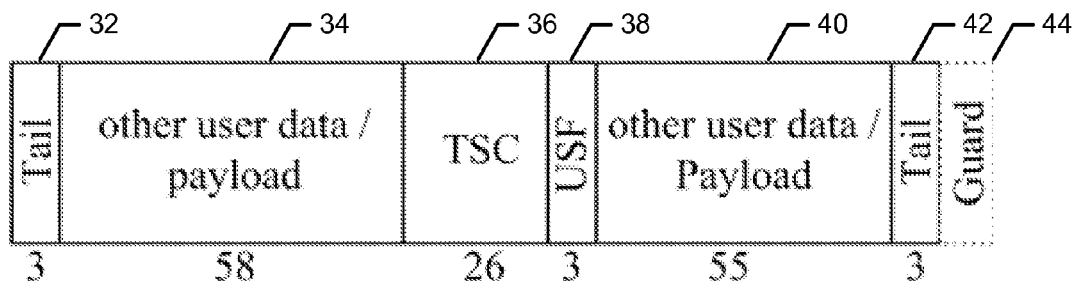
Figure 3B:
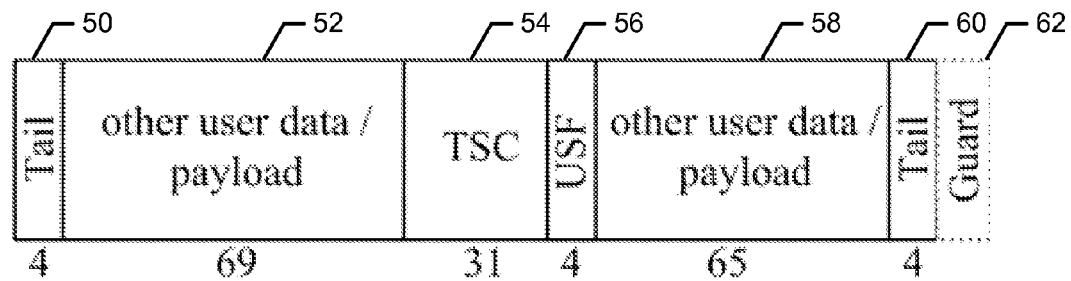

Having thus described the example embodiments of the invention in general terms, reference will now be made to the accompanying drawings, which are not necessarily drawn to scale, and wherein:

FIG. 1 is a schematic representation of a system having a communication device that may be configured for reference symbol sequence allocation and that may benefit from some example embodiments of the present invention;

FIG. 2 is a block diagram of an apparatus that may be embodied by a communication device and/or an base station in accordance with some example embodiments of the present invention;

FIG. 3a illustrates an example burst structure for EGPRS2A in DAS-7 to DAS-12;

FIG. 3b illustrates the burst structure for EGPRS2B in DBS-5 to DBS-12; and

Figure 4:
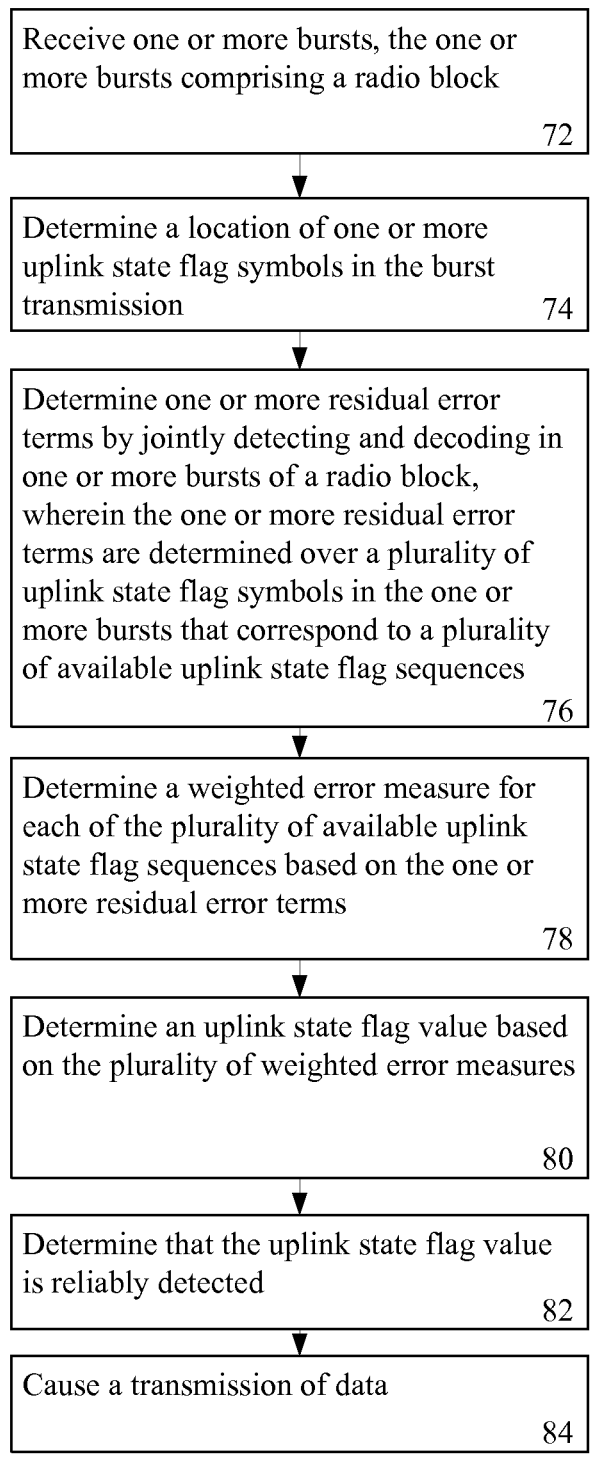

FIG. 4 is a flow chart illustrating operations performed by an example communication device in accordance with some example embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Each of EGPRS, EGPRS2A and EGPRS2B comprise a plurality of modulation schemes, for example, a modulation scheme used in accordance with EGPRS may include Gaussian Minimum-Shift Keying (GMSK), 8-Phase-Shift Keying (8PSK) modulation and/or the like. In some examples, the modulation used in EGPRS2 may also include Quadrature Phase-Shift Keying (QPSK), 16- and 32-Quadrature Amplitude Modulation (QAM) and/or the like.

Further, and in some examples, each of EGPRS, EGPRS2A and EGPRS2B define one or more modulation and coding schemes. For example, EGPRS is configured to operate ten modulation and coding schemes (MCS-0 to MCS-9). In EGPRS2A, for example, eight modulation and coding schemes (DAS-5 to DAS-12) have been specified. In EGPRS2B, for example, eight additional modulation and coding schemes have been specified (DBS-5 to DBS-12). Other modulation and coding schemes may also be made available in accordance with the example modulation and coding schemes defined.

In some examples, EGPRS and EGPRS2, as described with reference to GSM, may include a plurality of different USF bit sequences that can be transmitted to one or more communication devices, such as via a base station. In some examples, the plurality of USF bit sequences may be defined as eight USF bit sequences that are associated with the bursts available in a radio frame in accordance with an example Time Division Multiple Access (TDMA) scheme. Other bit sequences and/or flags may be used with respect to alternative communication systems.

EGPRS and EGPRS2 each define a burst structure. In the burst structure, in some examples, the USF symbols are located to the right of the Training Sequence Code (TSC). For example, in EGPRS2A DAS-7 to DAS-12, the burst structure includes a tail of 3 symbols, followed by 58 symbols of other user data and/or payload, followed by 26 TSC symbols, then 3 USF symbols, followed by 55 other user data and/or payload symbols and then 3 tail symbols before the guard period. By way of further example, in EGPRS2B DBS-5 to DBS-12 includes a tail of 4 symbols, followed by 69 symbols of other user data and/or payload, followed by 31 TSC symbols, then 4 USF symbols, followed by 65 other user data and/or payload symbols and then 4 tail symbols before the guard period. See e.g. FIGS. 3a and 3b.

In some examples, the channel coding used in USF for MCS-5 to MCS-9 (8PSK) comprises a (36, 3) block code. A (36, 3) block code, for example, describes an instance in which 3 USF bits are encoded to 36 USF bits that are spread across 4 bursts of a radio block, such that 9 USF bits are transmitted per burst. In this example coding, the USF bits in each burst, for example, are located at the bit positions [150, 151, 168, 169, 171, 172, 177, 178, 195] before the modulation mapping (for example, mapping from bits to symbols).

In EGPRS2A, for example, the number of USF symbols per burst is 3, which results in 9 bits that are transmitted per burst for DAS-5 to DAS-7. In some examples, DAS-5 to DAS-7 (8PSK) uses the same USF bit mapping on a burst as for example MCS-5. DAS-8 to DAS-9 (16QAM) uses, for example, 12 bits per burst, which are placed at bit positions [232-243]. In further examples, the USF symbols in DAS-10 to DAS-12 (32QAM) are also, for example located next to, to the right of or otherwise after the TSC in the burst, since the 15 USF bits per burst are placed at positions [290-304].

In some examples and in EGPRS2B the number of USF symbols per burst is 4. For DBS-5 to DBS-6 (QPSK) the 8 USF bits per burst are placed, for example, at bit positions [138-145]. For DBS-7 to DBS-9 (16QAM) the 16 USF bits are placed, for example at bit positions [276-291], further the 20 USF bits per burst in DBS-10 to DBS-12 (32QAM) are placed at bit positions [345-364]. Thus, for DBS-5 to DBS-12 the USF symbols are also located to the right, after or otherwise next to the TSC symbols.

As described herein, the performance requirements for detection and decoding of the USF symbols are strictly defined. As such in some example embodiments, the method, apparatus and computer program product as is described herein enable the joint detection and decoding of the USF. In some example embodiments, the location of the USF symbols, positioned after, next to or to the right of the TSC in a burst advantageously, for example, enables the joint detection and decoding within the defined performance requirements. In some example embodiments and based on a location of the USF symbols, the interfering symbols from the TSC are determined. For example, USF joint detection and decoding can be achieved by evaluating and comparing a metric for the available USF sequences defined by EGPRS and EGPRS2 while taking the Inter Symbol Interference (ISI) from TSC symbols into account. Additionally, in some example embodiments and in an instance in which equalization has already been conducted, additional symbols positioned after, next to, or to the right of, the USF symbols in the burst (for example the payload symbols) may also be utilized when decoding the USF. In some example embodiments, the USF sequence with the best fit (e.g. measured by the smallest weighted squared error and/or the like) is selected as the best candidate for the USF sequence, and the uplink state flag value is chosen accordingly. Additionally, in some example embodiments a verification of the reliability of the detected USF value can be performed, for example based on the determined fit of the USF sequences.

A method, apparatus and computer program product are provided herein for enabling the joint detection and decoding of uplink state flag symbols. In this regard, a method is provided that computes one or more residual error terms over one or more time indices in one or more bursts of a radio frame for a plurality of available uplink state flag symbols that corresponds to a plurality of available uplink state flag sequences. The residual error terms are computed while taking the inter symbol interference contribution from the received training sequence code into account. The method of this embodiment may also determine a weighted error measure for each of the plurality of available uplink state flag sequences based on the one or more available error terms from one or more bursts. The method of this embodiment may also select the uplink state flag value based on the weighted error measure associated with the plurality of available uplink state flag sequences and may ensure that the uplink state flag value is reliably detected.

Although the method, apparatus and computer program product as described herein may be implemented in a variety of different systems, one example of such a system is shown in FIG. 1, which includes a communication device (e.g., communication device 10) that is capable of communication via a base station 12, such as an access point, a macro cell, a Node B, an eNB, Base Transceiver Station (BTS), a coordination unit, a macro base station or other access point, with a network 14 (e.g., a core network). While the network may be configured in accordance with GSM, other networks, such as LTE™ or LTE-Advanced (LTE-A™), may support the method, apparatus and computer program product of some embodiments of the present invention including those configured in accordance with wideband code division multiple access (W-CDMA™), CDMA2000, general packet radio service (GPRS™), IEEE™ 802.11 standard for wireless fidelity (WiFi), wireless local access network (WLAN™) Worldwide Interoperability for Microwave Access (WiMAX™) protocols, and/or the like.

The network 14 may include a collection of various different nodes, devices or functions that may be in communication with each other via corresponding wired and/or wireless interfaces. For example, the network 14 may include one or more cells, including base station 12, which may serve a respective coverage area. The base station 12 may be, for example, part of one or more cellular or mobile networks or public land mobile networks (PLMNs). In turn, other devices such as processing devices (e.g., personal computers, server computers or the like) may be coupled to the communication device 10 and/or other communication devices via the network 14.

A communication device, such as the communication device 10 (also known as user equipment (UE), a mobile terminal or the like), may be in communication with other communication devices or other devices via the base station 12 and, in turn, the network 14. In some cases, the communication device 10 may include an antenna or a plurality of antennas for transmitting signals to and for receiving signals from an base station 12.

In some example embodiments, the communication device 10 may be a mobile communication device such as, for example, a mobile telephone, portable digital assistant (PDA), pager, laptop computer, STA, or any of numerous other hand held or portable communication devices, computation devices, content generation devices, content consumption devices, or combinations thereof. Other such devices that are configured to connect to the network include, but are not limited to a refrigerator, a security system, a home lighting system, and/or the like. As such, the communication device 10 may include one or more processors that may define processing circuitry and a processing system, either alone or in combination with one or more memories. The processing circuitry may utilize instructions stored in the memory to cause the communication device 10 to operate in a particular way or execute specific functionality when the instructions are executed by the one or more processors. The communication device 10 may also include communication circuitry and corresponding hardware/software to enable communication with other devices and/or the network 14.

In one embodiment, for example, the communication device 10 and/or the base station 12 may be embodied as or otherwise include an apparatus 20 as generically represented by the block diagram of FIG. 2. While the apparatus 20 may be employed, for example, by a communication device 10 or a base station 12, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communication interface 26 and, in some cases, a user interface 29. As such, the processing circuitry may be embodied as a circuit chip (e.g., an integrated circuit chip) configured (e.g., with hardware, software or a combination of hardware and software) to perform operations described herein. However, in some embodiments taken in the context of the communication device 10, the processing circuitry may be embodied as a portion of a mobile computing device or other mobile terminal. In some examples, the processing circuitry 22 and/or the processor 24 make take the form of a processing system in some example embodiments.

The user interface 29 (if implemented) may be in communication with the processing circuitry 22 to receive an indication of a user input at the user interface and/or to provide an audible, visual, mechanical or other output to the user. As such, the user interface may include, for example, a keyboard, a mouse, a trackball, a display, a touch screen, a microphone, a speaker, and/or other input/output mechanisms. The apparatus 20 need not always include a user interface. For example, in instances in which the apparatus is embodied as a base station 12, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the communication device 10 and the base station 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In some example embodiments, a burst of a radio frame may be received, such as via the communication interface 26. Upon receipt of the one or more bursts, the processing circuitry 22, the processor 24 or the like, may be configured to determine an error term for USF symbols in the one or more bursts, while compensating for the inter symbol interference caused by the one or more TSC symbols and/or other symbols in the burst. Using, the location of the TSC symbols and the location of one or more USF symbols, the processing circuitry 22, the processor 24, or the like, may determine a weighted error measure for each of the available USF sequences (e.g. there are 8 available USF sequences in EGPRS2). The one or more weighted error measures for the one or more bursts may be evaluated, such as by the processing circuitry 22, the processor 24 or the like, for a plurality of available USF sequences or USF symbols. In some example embodiments, the USF value is determined based on the USF sequence with the lowest weighted error measure.

In some example embodiments, the apparatus, method and computer program product may be defined by or otherwise represented as a system model. The system model of some example embodiments, may denote the transmitted symbols as $x=[x_1, \ldots, x_N]^T$. As such, the received burst at time index n is then given by, for example:

$$y_n = \sum_{i=0}^{L-1} h_i x_{n-i} + v_n \quad (1)$$

where $y_n=[Y_{n,1}, \ldots, y_{n,n_{sps}}]^T$ is the received burst, with an example oversampling factor $n_{sps}$. The ith tap in the channel impulse response with symbol length L is given by $h_i=[h_{i,1}, \ldots, h_{i,n_{sps}}]^T$, and $\upsilon_n$ denotes the noise term at time n. The system model in (1) can be formulated, for example, as:

$$y=Hx+\upsilon \quad (2)$$

where H is the channel matrix of size M×N, while y and $\upsilon$ are vectors of size M. Although the system models described with reference to equations (1) and (2) are used to describe some example embodiments, different variations or refinements of these models can also be used in other example embodiments.

Based on the received burst, $N_u$ may define the index in x (e.g. symbol location) where the first USF symbol is present and $N_{USF,symb}$ may represent the number of USF symbols per burst. In some example embodiments, the USF symbols may be the symbols $x_{USF}=[x_{N_u}, x_{N_u+(N_{USF,symb}-1)}]^T$ where $N_{USF,symb}=3$ for EGPRS2A and $N_{USF,symb}=4$ for EGPRS2B. An index k may be used in some examples to distinguish between the different bursts in the radio block.

Furthermore, $\hat{x}_j^{(k)}$ is configured to represent the estimated symbols transmitted under the assumption that the jth USF sequence is used. In other words $\hat{x}_j^{(k)}$ could contain symbols from the TSC, and/or symbols from the jth of the plurality of the available USF sequences. Alternatively or additionally, different formulations of $\hat{x}_j^{(k)}$ may also incorporate the additional data symbols that are located next to or in the proximity of the USF symbols. As such, $\hat{x}_j^{(k)}$ is compared to the received signal and a weighted error measure $\epsilon_j$ is determined, such as by the processing circuitry 22, the processor 24 or the like.

In some example embodiments, the weighted error measure $\epsilon_j$ may typically comprise a combination of squared residual errors for each burst of the radio frame. As such, given $\hat{x}_j^{(k)}$ the weighted error measure $\epsilon_j$ arising when using the jth USF sequence (e.g. j denotes that it is the jth admissible USF sequence) may be calculated as:

$$\varepsilon_j = \sum_k w_k f\left(y^{(k)}, H^{(k)}, \hat{x}_j^{(k)}\right) \tag{3}$$

where $w_k$ is a scalar weighting of the kth burst and $f(\cdot)$ is the error function that is configured to calculate, for example, the squared residual error with k spanning the bursts that are used in the evaluation of the error measure. Further still, in some examples one or more bursts may be disregarded if they are heavily corrupted by noise.

In some example embodiments and in an instance in which the noise term is Additive White Gaussian Noise (AWGN), e.g. $v^{(k)} \sim \mathcal{CN}(0, \sigma_k^2 I)$ where $\sigma_k^2$ denotes the noise variance for the k'th burst and I is the identity matrix, an example error function may be recited as:

$$f\left(y^{(k)}, H^{(k)}, \hat{x}_j^{(k)}\right) = \sum_{n=N_u}^{N_u+N_1^{(k)}} \left\| y_n^{(k)} - \sum_{i=0}^{L-1} h_i^{(k)} \hat{x}_{j,n-i}^{(k)} \right\|^2 \tag{4}$$

$$= \sum_{n=N_u}^{N_u+N_1^{(k)}} \| e_{j,n}^{(k)} \|^2$$

with the ith tap of the channel impulse response of symbol length L given by $h_i = [h_{i,1}, \ldots, h_{i,n_{sps}}]^T$. In equation (4) $e_{j,n}^{(k)}$ represents the residual error term and $N_u$ defines the index in x where the first USF symbol is present. Alternatively or additionally and in an instance in which it is determined that the noise is colored, such as by the processing circuitry 22, the processor 24 or the like, a prewhitening operation may be applied that is configured to remove a correlation in the noise. In some example embodiments, equation (4) may identify symbols to the left of the USF symbols in a burst, which includes indices $n=[N_u-L+1, \ldots, N_u-1]$ in $\hat{x}_j^{(k)}$. As a result, the ISI from the TSC symbols can be cancelled such as by the processing circuitry 22, the processor 24 or the like.

In some example embodiments, the scalar weighting can be set to a uniform value implying that each burst is equally weighted. Alternatively or additionally, in an instance in which the noise variance is determined, such as by the processing circuitry 22, the processor 24 or the like, the noise variance may be reflected by $w_k = 1/\sigma_k^2$. In some example embodiments, other a-priori information may also be used by the processing circuitry 22, the processor 24 or the like when choosing the weighting parameter.

Based on the measurement of the weighted error measure $\epsilon_j$, in some example embodiments, the USF value with the smallest or lowest weighted error measure may be chosen as the detected USF value, for example:

$$USF = \underset{j}{\mathrm{argmin}}\,\varepsilon_j, \tag{5}$$

$$j \in \{1, \ldots, N_{USF,values}\}$$

where $N_{USF,values}$ is the number of admissible USF values. For example and in some example embodiments the number of admissible USF values in the GSM communication system may be eight. Alternatively or additionally, other admissible USF values may be determined in alternate communication systems.

In some example embodiments the different weighted error measures $\epsilon_j$ for $j \in \{1, \ldots, N_{USF,values}\}$ can be compared against each other to ensure that the uplink state flag value is reliably detected. In an instance in which the comparison is made, such as by the processing circuitry 22, the processor 24 or the like, and the USF value is not reliably detected, then processing circuitry 22, the processor 24 or the like may be configured to determine the USF value to be invalid. In instances in which the USF value is reliably is detected, then the USF value may be declared valid. For example, and in some example embodiments, the detected USF value can be declared invalid if the ratio between the smallest and second smallest weighted error measures does not exceed a given threshold.

FIG. 3a illustrates an example burst structure in DAS-7 to DAS-12. Referring to FIG. 3a, the vector $x_j^{(k)}$ for EGPRS2A consists of: 3 tail symbols 32, 58 data symbols 34, 26 TSC symbols 36, 3 USF symbols 38, 55 data symbols 40, 3 tail symbols 42 and a guard period 44:

$$x_j^{(k)} = \left[ \mathrm{tail}_1^{(k)}, \ldots, \mathrm{tail}_3^{(k)}, d_1^{(k)}, \ldots d_{58}^{(k)}, t_1^{(k)}, \ldots, t_{26}^{(k)}, \underbrace{u_{j,1}^{(k)}, u_{j,2}^{(k)}, u_{j,3}^{(k)}}_{\text{index } N_u}, d_{59}^{(k)}, \ldots, d_{116}^{(k)}, \mathrm{tail}_4^{(k)}, \ldots, \mathrm{tail}_6^{(k)} \right]^T. \tag{6}$$

In some example embodiments, the positive integer $N_1^{(k)} \leq N_{USF,symb}+L-1$ specifies the number of symbols used in the error function in the kth burst. In an instance in which $N_1^{(k)} > N_{USF,symb}$ is selected, the ISI from data symbols and, in some cases from TSC symbols, will be determined and equation (4) may further be used by the processing circuitry 22, the processor 24 or the like to determine the error function based on the transmitted symbols positioned adjacent to the USF symbols.

where $\mathrm{tail}_i^{(k)}$ denote the tail symbols, $d_i^{(k)}$ the data symbols, $t_i^{(k)}$ the TSC symbols, and $u_{j,i}^{(k)}$ the ith USF symbol in the jth admissible USF sequence in burst k.

In some example embodiments, the summation of the squared residual error, $\|e_{j,n}^{(k)}\|^2$, may be accomplished over several time indices, i.e. $n = \{N_u, \ldots, N_u+N_1^{(k)}\}$, where $N_1^{(k)}$ is a positive integer $N_1^{(k)} \geq N_{USF,symb}+L-1$, and $N_{USF,symb}$ is the number of USF symbols per burst. At the time index $n=N_u$, the error may be represented as:

$$\|e_{j,N_u}^{(k)}\|^2 = \left\|y_{N_u}^{(k)} - \sum_{i=0}^{L-1} h_i^{(k)} \hat{x}_{j,N_u-i}^{(k)}\right\|^2 = \left\|y_{N_u}^{(k)} - \left(h_0^{(k)} u_{j,1}^{(k)} + \overbrace{\sum_{i=1}^{L-1} h_i^{(k)} \hat{x}_{j,N_u-i}^{(k)}}^{\text{ISI part}}\right)\right\|^2$$

$$= \left\|y_{N_u}^{(k)} - \left(h_0^{(k)} u_{j,1}^{(k)} + [h_1^{(k)}, \ldots, h_{L-1}^{(k)}] \underbrace{\begin{bmatrix} t_{26}^{(k)} \\ t_{25}^{(k)} \\ \vdots \\ t_{26-L+2}^{(k)} \end{bmatrix}}_{\text{ISI part}}\right)\right\|^2.$$

(7)

In an instance in which $n=N_u$ inter symbol interference (e.g. ISI part) arises from the TSC symbols, $t_{q_1}^{(k)}$, where $q_1 = \{26-L+2, \ldots, 26\}$, ISI may be cancelled completely when the channel length, L, is shorter than the number of ISI free TSC symbols.

The error contribution may also be determined for time index $n=N_{USF,symb}+L-1 \triangleq N_2$. For EGPRS2A this time index is, $N_2 = 3+(L-1) = L+2$, where the error may be represented as:

FIG. 3b illustrates the burst structure for EGPRS2B in DBS-5 to DBS-12. In EGPRS2B DBS-5 to DBS-12 includes a tail of 4 symbols 50, followed by 69 of other user data and/or payload symbols 52, followed by 31 TSC symbols 54, then 4 USF symbols 56, followed by 65 other user data and/or payload symbols 58 and then 4 tail symbols 60 before the guard period 62.

$$\|e_{j,N_2}^{(k)}\|^2 = \left\|y_{N_2}^{(k)} - \sum_{i=0}^{L-1} h_i^{(k)} \hat{x}_{j,N_2-i}^{(k)}\right\|^2 = \left\|y_{N_2}^{(k)} - \left(\overbrace{\sum_{i=0}^{L-2} h_i^{(k)} \hat{x}_{j,N_2-i}^{(k)}}^{\text{ISI part}} + h_{L-1}^{(k)} u_{j,3}^{(k)}\right)\right\|^2$$

$$= \left\|y_{N_2}^{(k)} - \left([h_0^{(k)}, \ldots, h_{L-2}^{(k)}] \underbrace{\begin{bmatrix} d_{59+L-1}^{(k)} \\ \vdots \\ d_{61}^{(k)} \\ d_{60}^{(k)} \\ d_{59}^{(k)} \end{bmatrix}}_{\text{ISI part}} + h_{L-1}^{(k)} u_{j,3}^{(k)}\right)\right\|^2$$

(8)

In this example, the ISI is dependent on the second data part in the burst, e.g. the estimated symbols after the USF symbols, $d_{q_2}^{(k)}$, where $q_2 = \{59, \ldots, 58+L\}$. In this example case, the ISI may be cancelled in an instance in which the data symbols next to the USF symbols have been detected.

In some example embodiments, ISI contribution may depend on the time index. For example, an ISI in a first time index may consist both of known training sequence symbols, t, and estimated data, d in an instance in which $n=N_u+N_{USF,symb} \triangleq N_3$, and the channel length is longer than the number of USF symbols in one burst, i.e. $L>N_{USF,symb}$ (e.g. 3 in EGPRS2A). In such an example and assuming that L=5, in that case the error in time index $n=N_3$ may be represented as:

FIG. 4 illustrate example operations performed by a method, apparatus and computer program product, such as apparatus 20 of FIG. 2 in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described herein may be embodied by computer program instructions. In this regard, the computer program instructions which embody the procedures described herein may be stored by a memory 28 of an apparatus employing an $$\|e_{j,N_3}^{(k)}\|^2 = \left\|y_{N_3}^{(k)} - \sum_{i=0}^{L-1} h_i^{(k)} \hat{x}_{j,N_3-i}^{(k)}\right\|^2$$

$$= \left\|y_{N_3}^{(k)} - \left(\overbrace{h_0^{(k)} d_{59}^{(k)}}^{\text{ISI part from data}} + [h_1^{(k)} \; h_2^{(k)} \; h_3^{(k)}] \begin{bmatrix} u_{j,3}^{(k)} \\ u_{j,2}^{(k)} \\ u_{j,1}^{(k)} \end{bmatrix} + \overbrace{h_4^{(k)} t_{26}^{(k)}}^{\text{ISI part from TSC}}\right)\right\|^2.$$

(9)

embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 4, when executed, convert a computer or processing circuitry into a particular machine configured to perform an example embodiment of the present invention. Accordingly, the operations of FIG. 4 define an algorithm for configuring a computer or processing circuitry 22, e.g., processing system, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations herein either alone or in combination with any others among the features described herein.

As is shown with respect to operation 72, the apparatus 20 embodied, for example by a communications device 10, may include means, such as the processing circuitry 22, the processor 24, the communication interface 26 or the like, for receiving one or more bursts, the one or more bursts comprising a radio block. As is shown with respect to operation 74, the apparatus 20 embodied, for example by a communications device 10, may include means, such as the processing circuitry 22, the processor 24, or the like, for determining a location of one or more uplink state flag symbols in the burst transmission.

As is shown with respect to operation 76, the apparatus 20 embodied, for example by a communications device 10, may include means, such as the processing circuitry 22, the processor 24, or the like, for determining one or more residual error terms by jointly detecting and decoding in one or more bursts of a radio block, wherein the one or more residual error terms are determined over a plurality of uplink state flag symbols in the one or more bursts that correspond to a plurality of available uplink state flag sequences. In some examples, the apparatus 20 embodied, for example by a communications device 10, may further include means, such as the processing circuitry 22, the processor 24, or the like, for determining inter symbol interference based on at least one of a plurality of training sequence code symbols or one or more data symbols in the one or more bursts of the radio block. In some example embodiments, the one or more residual error terms are determined by compensating for the inter symbol interference of the training sequence code symbols or the one or more data symbols. The one or more data symbols may comprise the estimated bits or symbols other than those symbols that represent the uplink state flag sequence.

As is shown with respect to operation 78, the apparatus 20 embodied, for example by a communications device 10, may include means, such as the processing circuitry 22, the processor 24, or the like, for determining a weighted error measure for each of the plurality of available uplink state flag sequences based on the one or more residual error terms. As is shown with respect to operation 80, the apparatus 20 embodied, for example by a communications device 10, may include means, such as the processing circuitry 22, the processor 24, or the like, for determining an uplink state flag value based on the plurality of weighted error measures.

As is shown with respect to operation 82, the apparatus 20 embodied, for example by a communications device 10, may include means, such as the processing circuitry 22, the processor 24, or the like, for determining that the uplink state flag value is reliably detected. As is shown with respect to operation 84, the apparatus 20 embodied, for example by a communications device 10, may include means, such as the processing circuitry 22, the processor 24, the communication interface 26 or the like, for causing a transmission of data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
   identifying, with circuitry, a plurality of uplink state flag symbols in one or more bursts of a radio block, the plurality of uplink state flag symbols corresponding to a plurality of available uplink state flag sequences;
   determining, with the circuitry, one or more residual error terms by jointly detecting and decoding the one or more bursts, the one or more residual error terms being determined over the plurality of uplink state flag symbols;
   determining, with the circuitry, a weighted error measure for each of the plurality of available uplink state flag sequences based on the one or more residual error terms; and determining, with the circuitry, an uplink state flag value based on the plurality of weighted error measures.

2. A method according to claim 1, further comprising:
determining inter symbol interference based on at least one of a plurality of training sequence code symbols or one or more data symbols in the one or more bursts of the radio block.

3. A method according to claim 2, wherein the one or more residual error terms are determined by compensating for the inter symbol interference of the training sequence code symbols or the one or more data symbols.

4. A method according to claim 2, wherein the inter symbol interference determined from at least the training sequence code and/or the one or more data symbols is configured to be cancelled based on the determined one or more residual error terms.

5. A method according to claim 3, wherein the one or more data symbols comprise estimated bits or symbols other than those data symbols that represent the uplink state flag sequence.

6. A method according to claim 1, further comprising:
selecting the uplink state flag sequence based on a smallest weighted error measure associated with the plurality of available uplink state flag sequences.

7. A method according to claim 6, further comprising:
determining that the selected uplink state flag sequence matches an allocated uplink state flag sequence; and causing a transmission of data.

8. A method according to claim 1, further comprising: determining that the uplink state flag value is reliably detected.

9. An apparatus comprising:
circuitry configured to
identify a plurality of uplink state flag symbols in one or more bursts of a radio block, the plurality of uplink state flag symbols corresponding to a plurality of available uplink state flag sequences;
determine one or more residual error terms by jointly detecting and decoding the one or more bursts, the one or more residual error terms being determined over the plurality of uplink state flag symbols;
determine a weighted error measure for each of the plurality of available uplink state flag sequences based on the one or more residual error terms; and
determine an uplink state flag value based on the plurality of weighted error measures.

10. An apparatus according to claim 9, wherein the processing system is arranged to cause the apparatus to: determine inter symbol interference based on at least one of a plurality of training sequence code symbols or one or more data symbols in the one or more bursts of the radio block.

11. An apparatus according to claim 10, wherein the one or more residual error terms are determined by compensating for the inter symbol interference of the training sequence code symbols or the one or more data symbols.

12. An apparatus according to claim 10, wherein the inter symbol interference from at least the training sequence code and/or the one or more data symbols is configured to be cancelled based on the determined one or more residual error terms.

13. An apparatus according to claim 11, wherein the one or more data symbols comprise estimated bits or symbols other than those data symbols that represent the uplink state flag sequence.

14. An apparatus according to claim 9, wherein the processing system is arranged to cause the apparatus to:
select the uplink state flag sequence based on a smallest weighted error measure associated with the plurality of available uplink state flag sequences.

15. An apparatus according to claim 14, wherein the processing system is arranged to cause the apparatus to:
determine that the selected uplink state flag sequence matches an allocated uplink state flag sequence; and cause a transmission of data.

16. An apparatus according to claim 9, wherein the processing system is arranged to cause the apparatus to: determine that the uplink state flag value is reliably detected.

17. An apparatus according to claim 9, wherein the apparatus comprises at least one of a user equipment or a communications device.

18. An apparatus according to claim 9, wherein the apparatus is configured for use in at least one of global system for mobile communications, wideband code division multiple access, time division synchronous code division multiple access, a long term evolution or long term evolution advanced system.

19. A non-transitory computer-readable medium encoded with computer-readable instructions that when executed by a processor, cause the processor to perform a method comprising:
identifying a plurality of uplink state flag symbols in one or more bursts of a radio block, the plurality of uplink state flag symbols corresponding to a plurality of available uplink state flag sequences;
determining one or more residual error terms by jointly detecting and decoding the one or more bursts, the one or more residual error terms being determined over the plurality of uplink state flag symbols;
determine a weighted error measure for each of the plurality of available uplink state flag sequences based on the one or more residual error terms; and
determine an uplink state flag value based on the plurality of weighted error measures.

20. The non-transitory computer-readable medium according to claim 19, further comprising:
determining inter symbol interference based on at least one of a plurality of training sequence code symbols or one or more data symbols in the one or more bursts of the radio block.

* * * * *